US006981112B2

(12) United States Patent
Christofferson et al.

(10) Patent No.: US 6,981,112 B2
(45) Date of Patent: Dec. 27, 2005

(54) DYNAMIC CACHE DISABLE

(75) Inventors: Armin Harold Christofferson, Rochester, MN (US); Leon Edward Gregg, Rochester, MN (US); James Lawrence Tilbury, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 10/227,759

(22) Filed: Aug. 26, 2002

(65) Prior Publication Data

US 2004/0039886 A1     Feb. 26, 2004

(51) Int. Cl.[7] ............................................. G06F 12/00
(52) U.S. Cl. ...................... 711/156; 711/139; 711/118; 711/119; 711/126
(58) Field of Search ........................ 711/156, 126, 119, 711/139, 118

(56) References Cited

U.S. PATENT DOCUMENTS

| | | | |
|---|---|---|---|
| 4,433,374 A | | 2/1984 | Hanson et al. |
| 4,740,889 A | | 4/1988 | Motersole et al. |
| 5,146,578 A | * | 9/1992 | Zangenehpour ............. 711/137 |
| 5,257,370 A | * | 10/1993 | Letwin ........................ 711/113 |
| 5,297,270 A | | 3/1994 | Olson |
| 5,301,295 A | * | 4/1994 | Leary et al. ................. 711/125 |
| 5,507,028 A | * | 4/1996 | Liu ............................. 712/207 |
| 5,586,296 A | * | 12/1996 | Bernstein et al. ............ 711/138 |
| 5,689,679 A | * | 11/1997 | Jouppi ......................... 711/122 |
| 5,721,866 A | | 2/1998 | Ballard |
| 5,829,023 A | * | 10/1998 | Bishop ........................ 711/118 |
| 5,941,981 A | * | 8/1999 | Tran ............................ 712/207 |
| 6,021,470 A | | 2/2000 | Frank et al. |
| 6,092,149 A | * | 7/2000 | Hicken et al. ............... 711/113 |
| 6,134,643 A | * | 10/2000 | Kedem et al. ............... 711/213 |
| 6,434,608 B1 | * | 8/2002 | Desai .......................... 709/217 |
| 6,453,342 B1 | * | 9/2002 | Himmel et al. .............. 709/213 |

FOREIGN PATENT DOCUMENTS

GB          2335764 A     *   9/1999

* cited by examiner

Primary Examiner—Pierre Bataille
Assistant Examiner—Sheng-Jen Tsai
(74) Attorney, Agent, or Firm—Wood, Herron & Evans

(57) ABSTRACT

An apparatus, program product and method utilize a cache payback parameter for selectively and dynamically disabling caching for potentially cacheable operations performed in connection with a memory. The cache payback parameter is tracked concurrently with the performance of a plurality of cacheable operations on a memory, and is used to determine the effectiveness, or potential payback, of caching in a particular implementation or environment. The selective disabling of caching, in turn, is applied at least to future cacheable operations based upon a determination that the cache payback parameter meets a caching disable threshold.

17 Claims, 2 Drawing Sheets

DYNAMIC CACHE DISABLE

FIELD OF THE INVENTION

The invention relates to computers and memory access performed therewith, and in particular, to caching and cache control.

BACKGROUND OF THE INVENTION

The concept of "caching" has been used in a number of computer-related applications to improve computer performance in a relatively cost-effective manner. Caching typically involves the temporary storage of data in a relatively fast memory in a computer to permit the quick retrieval of that data as it is needed by the computer.

A memory may constitute practically any device capable of storing data in a volatile or non-volatile manner on behalf of a computer or other data processing system, including registers, solid state devices such as RAM's or ROM's, and various magnetic and/or optically-readable storage media such as magnetic disks, magnetic tape, optical disks, etc. Different types of memory will generally have different relative speeds, costs, and capacities, and as a result, often a computer incorporates multiple types of memory to attempt to effectively balance cost with performance.

In general, the faster the memory, the greater cost of that memory, and the greater capacity constraints that exist on that memory. For example, one of the fastest memory technologies is achieved using static random access memory (SRAM) devices integrated onto the same chip as a microprocessor. However, due to limited space on a chip, SRAM capacity is often highly constrained. At the other extreme, magnetic and optical storage media often provide nearly unlimited capacity at a much lower overall cost, but at the expense of speed.

To better balance performance and cost, computers are typically designed with multiple types of memory arranged in a hierarchical fashion, with each successively-faster level of memory acting as a cache for the lower levels of memory in the computer. For example, a typical computer includes one or more levels of SRAM cache memories, a main storage including relatively slower and less expensive dynamic random access memories (DRAM's), and non-volatile or persistent storage including magnetic disk drives and other direct access storage devices (DASD's).

Many caches simply serve as repositories for data that is stored at a relatively lower level of memory in a computer, whereby the data stored in a cache is often identical to the data stored at the lower level of memory. Still other caches are constructed during the operation of a computer to assist in accessing other types of data stored in the computer, whereby the data stored in a cache may represent other types of data, but may not be an identical copy of such data. As an example, many types of storage media organize data into various files that are grouped together in a hierarchical structure of directories or folders. It has been found that, in some instances, it is desirable to cache the list of files and their hierarchical relationships on a storage medium to assist in performing file operations on a storage medium. The actual files are not cached, only the information that enables the computer to access those files on demand.

This type of cache, referred to herein as a directory cache, may be used for performing operations such as file searches, file existence checks, etc. In applications where a computer is required to find files meeting certain search parameters, or to verify whether certain files exist prior to retrieving those files, for example, being able to access a directory cache stored in relatively fast main storage, rather than by accessing the much-slower actual storage medium can provide tremendous performance improvements.

Given that there is typically some overhead associated with initially storing data in a cache (e.g., as the data typically must first be retrieved from a relatively slower memory), the benefits of caching are most prominent when cached data is reused multiple times. On the other hand, if cached data is only used once, caching that data may at best have only negligible benefit, and at worst, may actually decrease performance.

At best, cached data that is only used once will have no performance impact on a computer, particularly where storing data in a cache is performed in parallel with forwarding that data to the resource that originally requested that data. On the other hand, in some applications the cost of storing data in a cache may actually exceed the cost of simply retrieving the data without storing the data in a cache. In such applications, storing cached data that is never reused can actually decrease system performance.

In the case of directory caching, for example, there is always some degree of overhead required to build a cache of file information for a particular directory on a storage medium. The overhead is typically a result of the relatively slow access times of many types of storage media, e.g., optical disks. If cached directory information is reused in connection with a large number of file operations, such that the number of additional accesses to the storage medium is reduced, the savings often outweigh the cost of building the cache, thus improving the overall performance of the system. On the other hand, if only a few file operations are performed using cached directory information, the costs exceed the savings, thus decreasing system performance. In such instances, the "payback" of caching directory information may be insufficient to justify the costs.

Some cache-enabled applications support various mechanisms for disabling caching of potentially cacheable data. For example, some hardware designs support the ability to disable caching via hardware control to perform such functions as debugging a computer or computer program, or to prevent errors that might occur from attempting to cache certain ranges of memory addresses. Such hardware controls, however, are typically implemented for only narrow purposes, and are implemented for reasons other than improving system performance.

Still other designs permit caching of certain data to be disabled on a transaction-by-transaction basis. For example, an software application may be permitted to disable caching for certain types of data for which it is known will rarely if ever be reused. Also, certain requests for data from a storage medium may not be cached under certain circumstances particular to that request, e.g., where a current transfer rate for processing requests is above a certain threshold, or where a length of a data transfer is above a certain threshold. Such selective disabling of caching typically affects specific data transfers, and often requires that certain attributes of those data transfers be known beforehand.

In many applications, however, the potential payback of caching a particular piece of data may not be readily apparent from an analysis of any attribute of that data. For example, in the case of directory caching, it is difficult, if not impossible to determine whether it would be beneficial to build a cache of a given directory from an analysis of that directory. Therefore, a need continues to exist for a more flexible and broadly applicable manner of selectively and dynamically disabling caching in a computer to maximize system performance.

SUMMARY OF THE INVENTION

The invention addresses these and other problems associated with the prior art by providing an apparatus, program product and method in which a cache payback parameter is used in the selective disablement of caching for potentially cacheable operations performed in connection with a memory. The cache payback parameter is tracked concurrently with the performance of a plurality of cacheable operations on a memory, and is used to determine the effectiveness, or potential payback of caching in a particular implementation or environment. The selective disabling of caching, in turn, is applied at least to future cacheable operations based upon a determination that the cache payback parameter meets a caching disable threshold.

In one embodiment consistent with the invention, for example, caching of one or more cache locales on a storage medium (e.g., file directories on an optical storage medium) may be dynamically and selectively disabled in response to a cache payback parameter. In particular, in response to a request to access data in a cache locale on the storage medium, it may be determined whether a cache exists for the cache locale, and if a cache for the cache locale does not exist, it may be determined whether to disable caching based upon a cache payback parameter determined from prior accesses to the storage medium. If a determination is made that caching should not be disabled, a cache for the cache locale may instead be built.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
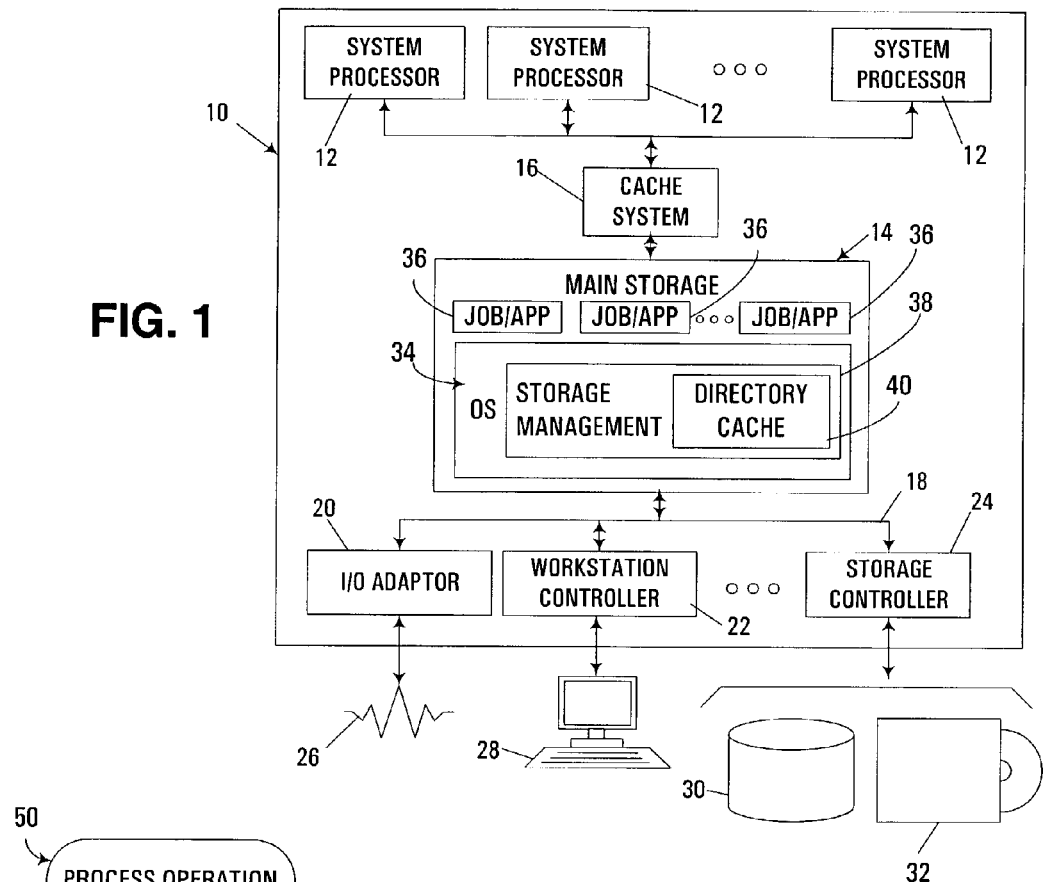
FIG. 1 is a block diagram of a computer incorporating dynamic cache disabling consistent with the invention.

The embodiments discussed hereinafter utilize dynamic cache disabling to selectively disable caching of data in response to a tracked cache payback parameter.

A cache payback parameter in the context of the invention is typically a tracked performance metric that is capable of being used to essentially track whether or not the cost of using a cache in a particular instance is less than the cost of not using a cache, or conversely, whether the benefits of using a cache exceed those of not using a cache. In one embodiment, for example, a cache payback parameter may be associated with a hit/miss ratio for a cache. In addition, in another embodiment, a cache payback parameter may be associated with a count of the number of hits to a cache (when caching is enabled) and/or the number of forfeited opportunities to use a cache (when caching is disabled). In some embodiments, for example, hits to a cache, as well as forfeited opportunities, may be separately logged as components of a cache payback parameter.

As will become more apparent below, a cache payback parameter is typically tracked over the course of multiple cacheable operations to a memory, i.e., memory access operations that are suitable for caching in a particular environment, regardless of whether data associated with those operations is in fact cached. Determinations as to whether to disable and/or enable caching are thus made based upon tracking of multiple operations, and such decisions typically disable or enable a cache for at least one future operation. In some embodiments, such a determination may also apply to a current operation in addition to one or more future operations.

To selectively disable caching, a cache payback parameter is typically compared with a caching disable threshold that is indicative of when the cost of caching exceeds the cost of not caching, thus indicating that caching should be disabled for future operations. A caching disable threshold may take a number of forms, and typically represents a comparison with some threshold value, e.g., to disable caching if a cache payback parameter is less than, or less than or equal to, a particular numeric value. In one embodiment, for example, a caching disable threshold may represent the ratio of the cost to build or construct a cache to the cost to perform a particular cacheable operation without the use of a cache.

Moreover, in embodiments where dynamic enabling of caching is supported, a cache payback parameter may be compared to an enable threshold that is indicative of when the cost of caching does not exceed the cost of not caching, thus indicating the caching should be enabled for future operations. A caching enable threshold may be based upon the same threshold value as a caching disable threshold, or may be based upon a different threshold value, e.g., to re-enable caching only when the payback goes significantly above the level that triggered an early disabling of a cache.

As will become more apparent below, by tracking a cache payback parameter in the course of performing multiple cacheable operations, a decision to disable caching may be made even in instances where the analysis of an individual operation is insufficient to provide a reliable indicator of whether to disable caching. Moreover, by applying the disabling of caching to future operations, individual assessment of the potential effectiveness of caching for those future operations may not be required.

Turning now to the Drawings, wherein like numbers denote like parts throughout the several views, FIG. 1 illustrates a computer 10 incorporating dynamic cache disabling consistent with the invention. Computer 10 generically represents, for example, any of a number of multi-user computers such as a network server, a midrange computer, a mainframe computer, etc., e.g., an AS/400 or eServer iSeries midrange computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Computer 10 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output (I/O) adaptor 20, a workstation controller 22 and a storage controller 24, which respectively provide external access to one or more external networks (e.g., a network 26), one or more workstations 28, and/or one or more storage devices such as one or more direct access storage devices (DASD's) 30 and/or one or more removable medium storage devices 32. Any number of alternate computer architectures may be used in the alternative.

To implement dynamic cache disabling and other functionality in computer 10, a number of software components are resident in and executed by computer 10, including an operating system 34 and one or more jobs or applications 36. For the specific implementation discussed herein, a portion of the operating system 34 may be considered to include storage management program code 38, as well as a dynamically-disabled directory cache 40. Each of components 34, 36, 38 and 40 are shown resident in main storage 14, but it will be appreciated that such components (or portions thereof) may be selectively paged in and out of the main storage from time to time using a virtual memory management system that is well known in the art.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

It will further be appreciated that the principles of the invention may apply to practically any application of data caching, whether implemented in a computer, another programmable electronic device, or even in any sub-component thereof, e.g., in a storage system, in a microprocessor, etc. Caching may be implemented in dedicated hardware, or may be implemented "virtually", e.g., by allocating a data structure in a working memory to cache data from a lower level of memory.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
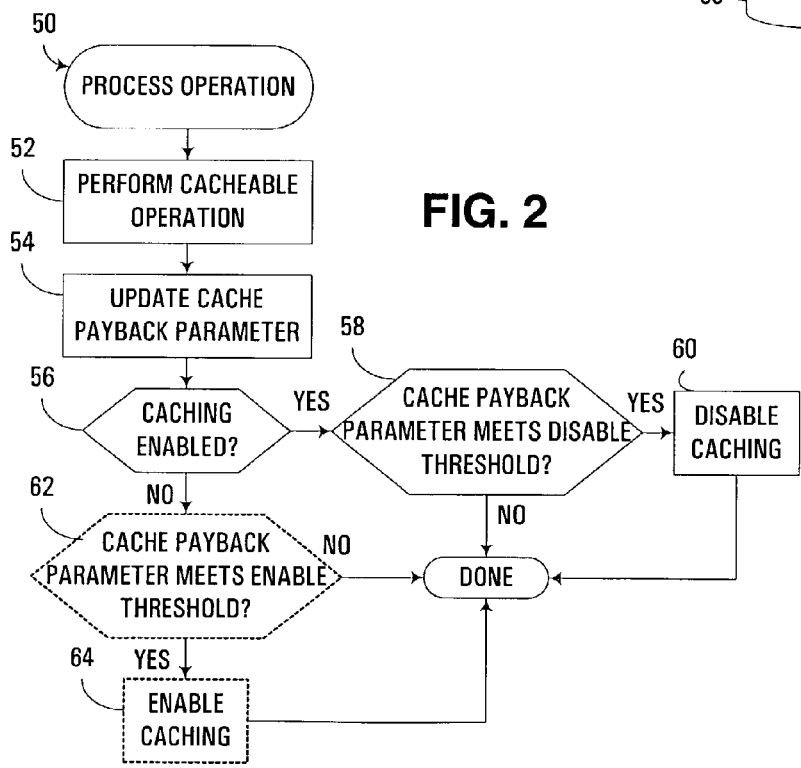
FIG. 2 is a flowchart illustrating the program flow of one implementation of a process operation routine executed by the storage management component referenced in FIG. 1.

FIG. 2 illustrates a basic implementation of dynamic cache disabling consistent with the invention, via a process operation routine 50 that is called by a computer or other cache-enabled device to process a cacheable operation, e.g., a memory operation that is capable of being processed using cached data, if such data is being cached. Routine 50 begins in block 52 to perform the cacheable operation as appropriate. Control then passes to block 54 to update the cache payback parameter based upon the current operation, and to then determine whether caching should be enabled or disabled in the manner described herein. In the alternative, actual performance of the desired cacheable operation may occur after the payback parameter tracking and/or cache disable/enable functionality. In still other embodiments, cache management functionality may occur in a separate thread from the operation processing functionality.

Block 54 may update the cache payback parameter, for example, by incrementing a hit count if caching is enabled, or incrementing a forfeit count if caching is disabled. For other cache payback parameter implementations discussed herein, the update of the parameter may incorporate other calculations as appropriate.

Next, block 56 determines whether caching is currently enabled, and if so, control is passed to block 58 to determine whether the current cache payback parameter meets a caching disable threshold. If so, caching is disabled for future operations by passing control to block 60 prior to terminating routine 50. Otherwise, routine 50 terminates without affecting the use of caching in future operations. It will be appreciated that the determination of whether the cache payback parameter meets a caching disable threshold will vary depending upon the particular criterion established for the caching disable threshold.

Returning to block 56, if caching is not enabled, control passes to block 62 to determine whether the cache payback parameter meets an enable threshold. If not, routine 50 terminates without affecting the use of caching in future operations. Otherwise, block 62 passes control to block 64 to enable caching for future operations. Routine 50 is then complete.

As shown in FIG. 2, routine 50 supports an implementation where caching, once disabled, can later be re-enabled. In other embodiments, however, it may be desirable to not support any re-enablement of caching based upon a cache payback parameter. In such an implementation, and as represented by the dashed lines in FIG. 2, block 62 and 64 may be omitted, whereby block 56 would simply terminate routine 50 if caching is not currently enabled.

In embodiments where caching may not be re-enabled based upon a cache payback parameter, caching may be permanently disabled once it is determined that caching is not effective. In other embodiments, however, caching may be selectively reenabled at various points in time, e.g., after a fixed time period, or after a change in circumstances in the computer.

Figure 3:
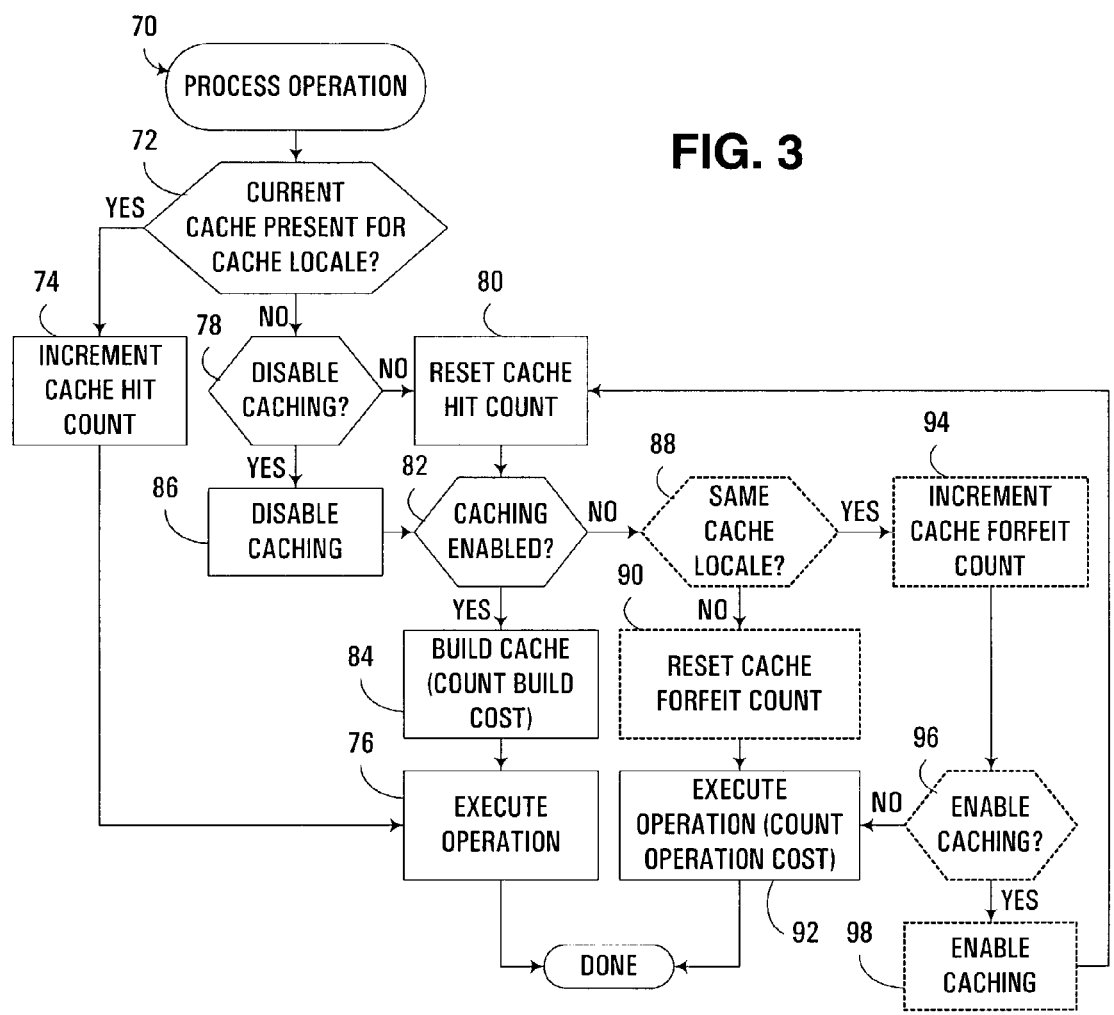
FIG. 3 is a flowchart illustrating the program flow of another implementation of a process operation routine executed by the storage management component referenced in FIG. 1.

Now turning to FIG. 3, one specific implementation of the invention is illustrated for use in connection with the management of file directories for removable optical disk media. This implementation addresses the problem that with increasing directory depth in a storage management system, and with many files in each directory, the number of media accesses required to perform many I/O operations rapidly becomes unsatisfactory. This is particularly true for optical disk media because access time is not particularly fast.

In particular, it has been found that one way to greatly improve performance in many applications is to cache the directory information for a current directory being accessed. This can allow a file operation (for example, an existence check) to be performed without any media access. In such an implementation, whenever a new directory is accessed, the entire directory typically must be accessed to build or construct the cache, but if a large number of file operations are thereafter performed in the current directory, the net payback can be very large. Such an implementation, for example, may be useful in the storage management system of an IBM eServer iSeries midrange computer system (e.g., as shown in FIG. 1, where a storage management component 38 resident in the operating system 34 is used to build one or more directory caches 40 for use in accessing a removable optical media accessible through an optical drive 32).

It has also been found, however, that a problem arises when only a "few" file operations are performed within one directory before switching to another directory. In the worst case, where every successive file operation is to a different directory, the time spent building the cache data for each directory would never be reused, resulting in a net performance decrease due to caching.

In one possible implementation, the cache payback parameter may simply take the form of a hit count, representing the number of hits to a directory cache before switching between directories. Caching enable/disable thresholds may be determined, in turn, based upon a calculated cost/benefit ratio for using the cache. In general, the type of directory structure may influence the cache cost, but for either UDF (Universal Disk Format) or HPOFS (High performance optical file System), it has been found that a relatively accurate cache cost can be calculated simply by determining the number of media accesses required to build the cache. Likewise, a relatively accurate cache benefit (or cost of non-caching) may be calculated simply by determining the number of media accesses required to do a file operation without the cache. For example, if a non-caching existence check requires 8 media accesses, but the cost of building the cache is 24 media accesses, then the ratio is 24/8, meaning that a positive net payback occurs when more then 3 file existence checks are done before changing to another directory.

With this ratio available, tracking of a cache payback parameter may be implemented, for example, by resetting a counter to zero each time a different directory is accessed, then incrementing the counter each time a file operation is performed on that directory. When there is a change to another directory, the current file operation count may be saved in a short list. Moreover, it may be desirable to examine all of the entries in the list to determine an average hit count. Then, if the average file operation count is greater than the cost/benefit ratio (3 in the example) a positive net payback is occurring, so caching remains enabled. If the average dips lower, however, caching may be disabled for file operations on future directories.

Through the use of the aforementioned averaged count, a determination of whether to cease bothering to construct new directory caches may be made each time another directory is accessed. It should be noted, however, that since the hit count is checked at each directory change, the hit count represents more than just a switch to cease cache operation—it provides an ongoing measure of probable cache effectiveness, which is continually used to make the decision to build, or not to build, the cache.

In some implementations, another situation can also make caching ineffective. In particular, if the number of files within one directory becomes large enough, then the cache effectiveness may become limited, until eventually it provides almost no advantage. Therefore, the determination of cache advantage in the previously-mentioned implementation can also be modified to account for cache "misses" (or ambiguous results). If most file operations result in a cache miss and the need to access the media anyway, then in that case, it may be desirable to discontinue caching.

One manner of accommodating this feature within the aforementioned hit counting scheme would be to simply increment the hit count when the cache is active, only when the cache actually provides the required file information. Put another way, file operations that result in a cache "miss," or that otherwise require an access to the storage medium, may not be logged in the hit count. Then, even if a large number of file operations are performed, if they all result in a cache miss, the hit count would still register a low number—which to the decision-making process appears that there is not a benefit to using the cache, thus matching the intuitive result. With this modification, the file operation count effectively becomes a count of the file operations benefitting from using the cache. When there is small or no benefit, then caching is stopped. While caching appears to be effective, it will continue to be used.

Process operation routine 70 of FIG. 3 illustrates one implementation of dynamic cache disabling in the aforementioned removable optical disk media environment. Routine 70 is called in response to a request from a computer software application, or from other program code in the operating system of computer 10, to perform a particular file operation.

Routine 70 relies on a hit count variable, a forfeit count variable, a build cost variable, and an operation cost variable. The hit count variable is used to log the number of uses of a directory cache before that directory cache becomes invalid. The forfeit count variable is used to log the number of file operations performed when caching is disabled, but which could have used a directory cache if caching had been enabled when the directory was first accessed. The build cost variable is used to record the number of media accesses required to build a directory cache, and the operation cost variable is used to count the number of media accesses required to perform a particular cacheable operation (e.g., a file existence check) without the use of a cache.

Routine 70 begins in block 72 by determining whether a cache is present for the cache locale being accessed via the requested cacheable file operation, here the directory on the storage medium with which the file operation is associated. If a cache already exists, control passes to block 74 to increment a cache hit count variable, indicating that the existing cache has been used for this particular file operation. Control then passes to block 76 to execute or perform the requested file operation. Routine 70 is then complete.

Returning to block 72, if it is determined that no valid directory cache is present for the cache locale associated with the requested operation, control passes to block 78 to determine whether caching should be disabled. For example, block 78 may be implemented to determine that caching should be disabled if the current hit count is less than the ratio of the build cost to the operation cost. Other determinations may be used in the alternative.

If block 78 does not determine that caching should be disabled, control passes to block 80 to reset the cache hit count variable. Control then passes to block 82 to determine whether caching is currently enabled. If so, control passes to block 84 to build a directory cache for the new cache locale. At this time, the number of media accesses required to build the directory cache may also be logged and stored in the build cost variable. Control then passes to block 76 to perform the requested operation, whereby routine 70 is then complete.

Construction of a directory cache may implement a number of algorithms. For example, caching of directory information may simply copy a directory structure from the storage medium to main storage. In the alternative, building a cache may construct other data structures, e.g., a hash table or other mechanism for accelerating the access to directory information.

Returning to block 78, if it is determined that caching should be disabled, control passes to block 86 to disable caching. Control then passes to block 82 to determine whether caching is currently enabled. As caching has just been disabled, block 82 will pass control to block 88 to determine whether the current file operation is for the same cache locale as the last file operation. In the case where caching is disabled on a particular file operation, the result of block 88 will typically be that the current file operation is for a different cache locale. In this event, control passes to block 90 to reset a cache forfeit count variable, and then to block 92 to perform the requested file operation. At this time, the number of media accesses required to perform the requested operation may also be logged and stored in the operation cost variable, representing the number of media accesses required to perform the operation without the use of a cache. Upon completion of block 92, routine 70 is complete.

Returning next to block 88, if it is determined that a file operation is directed to the same locale as the immediately previous file operation, control passes to block 94 to increment the cache forfeit count variable to indicate that this operation could have taken advantage of a previously-constructed cache if caching had been enabled. Control then passes to block 96 to determine whether caching should be re-enabled. If not, control passes to block 92 to perform the operation without caching. If so, however, control passes to block 98 to re-enable caching. Block 98 then passes control to block 80 to reset the cache hit count variable, build the directory cache, and perform the file operation using the cache, generally following the sequence of blocks 82, 84 and 76.

Caching will typically be re-enabled in routine 70 once the forfeit count, representing the number of consecutive accesses to the same directory or cache locale when caching is not enabled, exceeds a caching enable threshold. For example, block 96 may be implemented to determine that caching should be re-enabled if the current forfeit count is greater than the ratio of the build cost to the operation cost. Other determinations may be used in the alternative.

Various modifications may be made to the illustrated embodiments without departing from the spirit and scope of the invention. For example, as noted above, no support may be provided for reenabling caching responsive to a cache payback parameter, such that, in the implementation of FIG. 3, blocks 88–98 could be omitted. Also, disabling of caching may be permanent, or caching may be periodically re-enabled.

For example, it may be desirable to re-enable caching in response to a new application accessing a storage medium, since different applications may have different access characteristics that make caching more or less desirable. Caching may also be tracked on an application-by-application basis, such that payback parameters are tracked separately for each application accessing a storage medium or other memory. It may also be desirable to re-enable caching in response to the mounting of a new storage medium, e.g, in a removable optical storage media environment. In other implementations, re-enablement of caching may occur at regular time intervals.

As another modification, the tracking of cache payback parameters and/or the calculation of disable/enable thresholds may be performed on a global basis, or on a per-cache domain/locale basis. For example, in the aforementioned removable optical storage medium implementation of FIG. 3, it may be desirable to disable/enable caching for all cache directories as a group, or in the alternative, on a directory-by-directory basis.

As yet another modification, cache payback parameters and/or disable/enable thresholds may be based upon single values, or may be based upon rolling averages of multiple values. For example, hit counts and/or forfeit counts in the implementation of FIG. 3 may be logged to a list and averaged together to determine a cache payback parameter (e.g., by storing the counts in a list prior to resetting the respective variables in blocks 80 and 90). Similarly, build costs and/or operation costs may be logged and averaged in a like manner, particularly where operation costs may not be constant). Moreover, averages may be based on all previous calculations, or may be constrained to a fixed number of previous calculations, e.g., a rolling average of the last five hit counts. Furthermore, averages may be tracked globally or locally, e.g., where the hit counts for multiple directories are averaged together, or where multiple averaged hit counts are maintained for multiple directories, with each averaged hit count representing the average number of logged hits each time an associated directory is accessed.

Thresholds may vary for different cache locales, and averaging may be used as described above. Furthermore, it may be desirable to prime threshold values during an initialization sequence so that reasonable approximations of threshold values may be used before actual cost calculations are made (e.g. directory build costs and operation costs). Thresholds may also be statically defined, either as a result of known characteristics of a particular system, or through empirical determination, whereby the counting of costs in blocks 82 and 92 of FIG. 3 may not be required.

In still other embodiments, costs may be determined in a number of manners. In the embodiments discussed above, costs are in units of media accesses, typically based upon the assumption that most media accesses take approximately the same amount of time. In other embodiments, however, it may be desirable to track costs in actual units of time, or based upon other parameters, such as quantity of data transferred in a particular operation.

Other modifications will be apparent to one of ordinary skill in the art having the benefit of the instant disclosure. Therefore, the invention lies in the claims hereinafter appended.

What is claimed is:

1. A method of accessing data from a storage medium, the method comprising, in response to a request to access data associated with a cache locale on the storage medium:
   (a) determining whether a cache exists for the cache locale, wherein the cache locale comprises a first directory on the storage medium;
   (b) if a cache for the cache locale does not exist, determining whether to disable caching based upon a cache payback parameter determined from prior accesses to the storage medium, wherein the cache payback parameter is associated with a hit count associated with the first directory and representing a number of consecutive requests that are associated with the same directory on the storage medium;
   (c) disabling caching if a determination is made that caching should be disabled; and
   (d) building a cache for the cache locale if a determination is made that caching should not be disabled, wherein building the cache comprises building and caching directory information about the first directory on the storage medium;
wherein the method further comprises, after building the cache, incrementing the hit count associated with the first directory in response to each subsequent consecutive request associated with the first directory, and resetting the hit count associated with the first directory in response to a subsequent request associated with a second directory that is different from the first directory.

2. The method of claim 1, wherein the storage medium comprises a removable optical disk.

3. The method of claim 1, further comprising:
   (a) tracking a forfeit count representing a number of consecutive requests associated with the same cache locale when caching is disabled, and
   (b) enabling caching if the tracked number of consecutive requests meets a caching enable threshold.

4. The method of claim 3, wherein tracking the forfeit count includes incrementing the forfeit count in response to a request associated with the same cache locale as a prior request when caching is disabled, the method further comprising resetting the forfeit count in response to a request associated with a different cache locale as a prior request.

5. The method of claim 1, further comprising determining an operation cost associated with processing a request without a cache, wherein building the cache comprises determining a build cost associated with building the cache, and wherein determining whether to disable caching based upon the cache payback parameter includes comparing the cache payback parameter to a threshold associated with a ratio of the build cost to the operation cost.

6. An apparatus, comprising:
   (a) a processor; and
   (b) program code configured to be executed by the processor to track a cache payback parameter concurrently with performing a plurality of cacheable operations on a memory, and to selectively disable caching at least for future cacheable operations upon determining that the cache payback parameter meets a caching disable threshold, wherein the memory comprises a storage medium, and wherein the program code is configured to selectively disable caching by, in response to a request to access data associated with a cache locale on the storage medium:
      (i) determining whether a cache exists for the cache locale, wherein the cache locale comprises a first directory on the storage medium;
      (ii) if a cache for the cache locale does not exist, determining whether to disable caching based upon the cache payback parameter, wherein the cache payback parameter is associated with a hit count associated with the first directory and representing a number of consecutive requests that are associated with the same directory on the storage medium;
      (iii) disabling caching if a determination is made that caching should be disabled; and
      (iv) building a cache for the cache locale if a determination is made that caching should not be disabled, wherein building the cache comprises building and caching directory information about the first directory on the storage medium;
wherein the program code is further configured to, after building the cache, increment the hit count associated with the first directory in response to each subsequent consecutive request associated with the first directory, and to reset the hit count associated with the first directory in response to a subsequent request associated with a second directory that is different from the first directory.

7. The apparatus of claim 6, wherein the program code is configured to track the cache payback parameter by tracking a number of consecutive operations that utilize caching.

8. The apparatus of claim 6, wherein the memory is associated with a plurality of cache locales.

9. The apparatus of claim 8, wherein the caching disable threshold is associated with a ratio of the cost to build a cache with the cost of performing a cacheable operation without the use of a cache.

10. The apparatus of claim 8, wherein the program code is further configured to dynamically determine the cost to build a cache and the cost of performing a cacheable operation without the use of a cache.

11. The apparatus of claim 8, wherein the program code is configured to selectively disable caching at least for future cacheable operations upon determining that the cache payback parameter meets the caching disable threshold by selectively disabling caching for all of the plurality of cache locales.

12. The apparatus of claim 8, wherein the program code is configured to selectively disable caching at least for future cacheable operations upon determining that the cache payback parameter meets the caching disable threshold by selectively disabling caching for only a subset of the plurality of cache locales.

13. The apparatus of claim 6, wherein the program code is configured to selectively disable caching at least for future cacheable operations by additionally disabling caching for a current cacheable operation.

14. The apparatus of claim 6, wherein the program code is further configured to, when caching is disabled, selectively re-enable caching upon determining that the cache payback parameter meets a caching enable threshold.

15. The apparatus of claim 14, wherein the program code is configured to track the cache payback parameter by, when caching is disabled, tracking a number of consecutive operations that could have utilized caching.

16. A program product, comprising:
   (a) program code configured to track a cache payback parameter concurrently with performing a plurality of cacheable operations on a memory, and to selectively disable caching at least for future cacheable operations upon determining that the cache payback parameter meets a caching disable threshold, wherein the memory comprises a storage medium, and wherein the program code is configured to selectively disable caching by, in response to a request to access data associated with a cache locale on the storage medium:
 (i) determining whether a cache exists for the cache locale, wherein the cache locale comprises a first directory on the storage medium;
 (ii) if a cache for the cache locale does not exist, determining whether to disable caching based upon the cache payback parameter, wherein the cache payback parameter is associated with a hit count associated with the first directory and representing a number of consecutive requests that are associated with the same directory on the storage medium;
 (iii) disabling caching if a determination is made that caching should be disabled; and
 (iv) building a cache for the cache locale if a determination is made that caching should not be disabled, wherein building the cache comprises building and caching directory information about the first directory on the storage medium; and (b) a signal bearing medium bearing the program code; wherein the program code is further configured to, after building the cache, increment the hit count associated with the first directory in response to each subsequent consecutive request associated with the first directory, and to reset the hit count associated with the first directory in response to a subsequent request associated with a second directory that is different from the first directory.

17. The program product of claim 16, wherein the signal bearing medium includes at least one of a recordable medium and a transmission medium.

* * * * *